(12) United States Patent
Wagner et al.

(10) Patent No.: US 10,804,646 B2
(45) Date of Patent: Oct. 13, 2020

(54) DOMESTIC APPLIANCE HAVING AT LEAST ONE PLUG FOR AN ELECTRICAL CONNECTION

(71) Applicant: BSH Hausgeräte GmbH, Munich (DE)

(72) Inventors: Sebastian Wagner, Glött (DE); Bernd Kränzle, Dischingen (DE); Stephan Lutz, Zusamaltheim (DE); Paul Nistor, Dillingen (DE)

(73) Assignee: BSH Hausgeräte GmbH, Munich (DE)

( * ) Notice: Subject to any disclaimer, the term of this patent is extended or adjusted under 35 U.S.C. 154(b) by 0 days.

(21) Appl. No.: 16/334,768

(22) PCT Filed: Oct. 13, 2017

(86) PCT No.: PCT/EP2017/076214
§ 371 (c)(1),
(2) Date: Mar. 20, 2019

(87) PCT Pub. No.: WO2018/077634
PCT Pub. Date: May 3, 2018

(65) Prior Publication Data
US 2019/0393642 A1    Dec. 26, 2019

(30) Foreign Application Priority Data
Oct. 26, 2016    (DE) .......................... 10 2016 221 063

(51) Int. Cl.
*H01R 13/527*    (2006.01)
*H01R 13/506*    (2006.01)
(Continued)

(52) U.S. Cl.
CPC ......... *H01R 13/527* (2013.01); *H01R 13/506* (2013.01); *H01R 13/52* (2013.01);
(Continued)

(58) Field of Classification Search
CPC    H01R 13/527; H01R 13/516; H01R 13/5213; H01R 13/52; H01R 13/40;
(Continued)

(56) References Cited

U.S. PATENT DOCUMENTS 6,293,811 B1    9/2001    Frantz
6,918,782 B2 *    7/2005    Foster ................ H01R 13/6272
                                              439/301

(Continued)

FOREIGN PATENT DOCUMENTS

| DE | 102015101876 A1 | 8/2015 |
| DE | 112014003158 T5 | 3/2016 |
| JP | 2015210953 A | 11/2015 |

OTHER PUBLICATIONS

Fortron PPS, Celanese, https://www.celanese.com/engineered-materials/products/Fortron-PPS.aspx, Oct. 11, 2013 (Year: 2013).*

(Continued)

*Primary Examiner* — Edwin A. Leon
*Assistant Examiner* — Matthew T Dzierzynski
(74) *Attorney, Agent, or Firm* — Michael E. Tschpp; Andre Pallapies; Brandon G. Braun

(57) ABSTRACT

A household appliance includes a plug for electrical contacting. The plug includes a body for mechanically retaining an electrically conductive contact. A protective hood extends at least largely over the body and has a burning point which is higher than a burning point of a material of the body of the plug.

20 Claims, 9 Drawing Sheets

Figure 1:
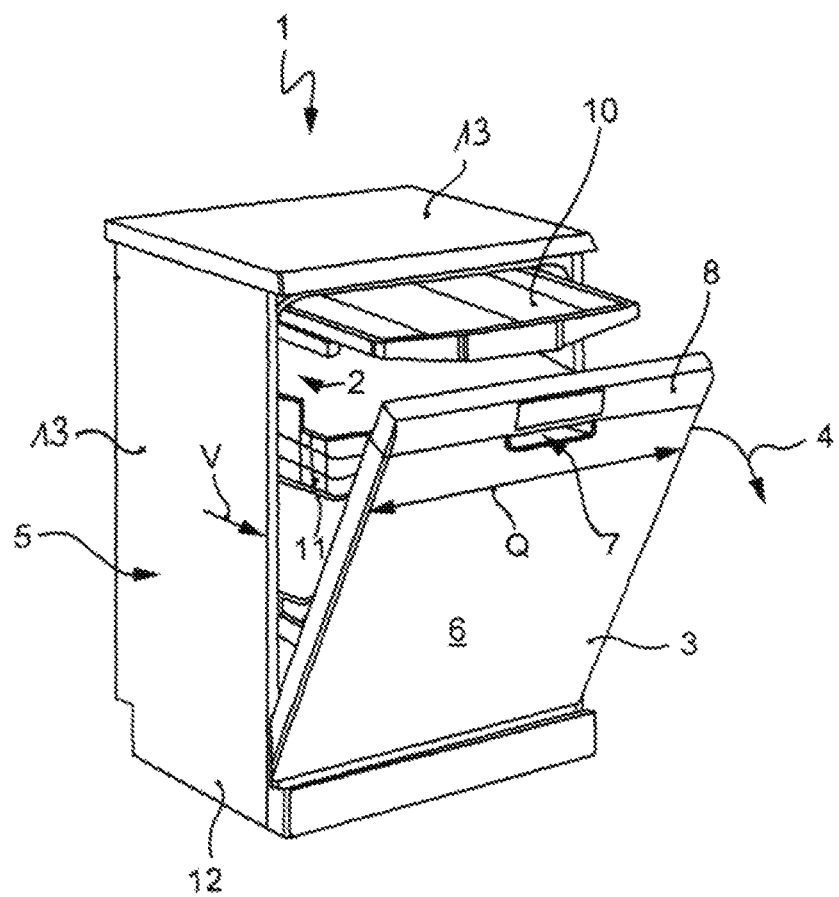

(51) Int. Cl.
*H01R 13/52* (2006.01)
*H02G 3/08* (2006.01)
*A47L 15/42* (2006.01)

(52) U.S. Cl.
CPC ......... *H01R 13/5213* (2013.01); *H02G 3/088* (2013.01); *A47L 15/42* (2013.01)

(58) Field of Classification Search
CPC .. H01R 13/42; H01R 13/4223; H01R 13/426; H01R 13/428; H01R 13/434; H01R 13/436; H01R 13/533; H01R 13/62; H01R 13/627; H01R 13/6271; H01R 13/6272; H01R 13/6273; H01R 13/629; A47L 15/4274; A47L 15/4285; H02G 3/088
See application file for complete search history.

(56) References Cited

U.S. PATENT DOCUMENTS

| | | | | |
|---|---|---|---|---|
| 7,037,129 B2* | 5/2006 | Lo | .................. | H01R 13/562 439/352 |
| 7,651,361 B2* | 1/2010 | Henry | ................ | H01R 13/6272 439/352 |
| 8,267,723 B2* | 9/2012 | Hering | .................. | H01R 13/73 439/660 |
| 8,382,492 B2* | 2/2013 | Hering | ................ | A47L 15/4251 439/101 |
| 8,939,735 B2* | 1/2015 | Heidecker | ............. | F04B 39/121 310/71 |
| 10,298,729 B2* | 5/2019 | Yamagishi | .............. | B29C 65/16 |
| 10,454,220 B2* | 10/2019 | Sakaizawa | ........... | H01R 12/716 |
| 10,461,478 B2* | 10/2019 | Sakaizawa | ........... | H01R 13/639 |
| 10,490,946 B2* | 11/2019 | Sakaizawa | ......... | H01R 13/6581 |
| 10,522,950 B2* | 12/2019 | Sakaizawa | .......... | H01R 13/639 |
| 2003/0012669 A1 | 1/2003 | Kawashima et al. | | |
| 2007/0093102 A1 | 4/2007 | Park et al. | | |
| 2009/0170985 A1 | 7/2009 | Ai et al. | | |
| 2010/0123363 A1* | 5/2010 | Poyner | ................ | A47L 15/4225 310/179 |
| 2011/0076162 A1 | 3/2011 | Heidecker et al. | | |
| 2018/0044506 A1* | 2/2018 | Kato | .................... | C08K 5/3415 |
| 2019/0162204 A1* | 5/2019 | Zoppas | ................. | D06F 39/085 |
| 2019/0316039 A1* | 10/2019 | Bauer | .................. | C08K 5/5393 |
| 2020/0091656 A1* | 3/2020 | Lee | ...................... | H01R 13/502 |
| 2020/0099171 A1* | 3/2020 | Sakaizawa | ......... | H01R 13/6471 |

OTHER PUBLICATIONS

Fortron 4665B6, Channel Prime Alliance, https://www.channelpa.com/download-product-pdf/index.php?id=16390&name=Fortron%C2%AE%204665B6, no date.*
English Translation of JP 2015210953 (Year: 2015).*
National Search DE 10 2016 221 063.7 dated Jun. 30, 2017.
International Search Report PCT/EP2017/076214 dated Dec. 4, 2017.

* cited by examiner

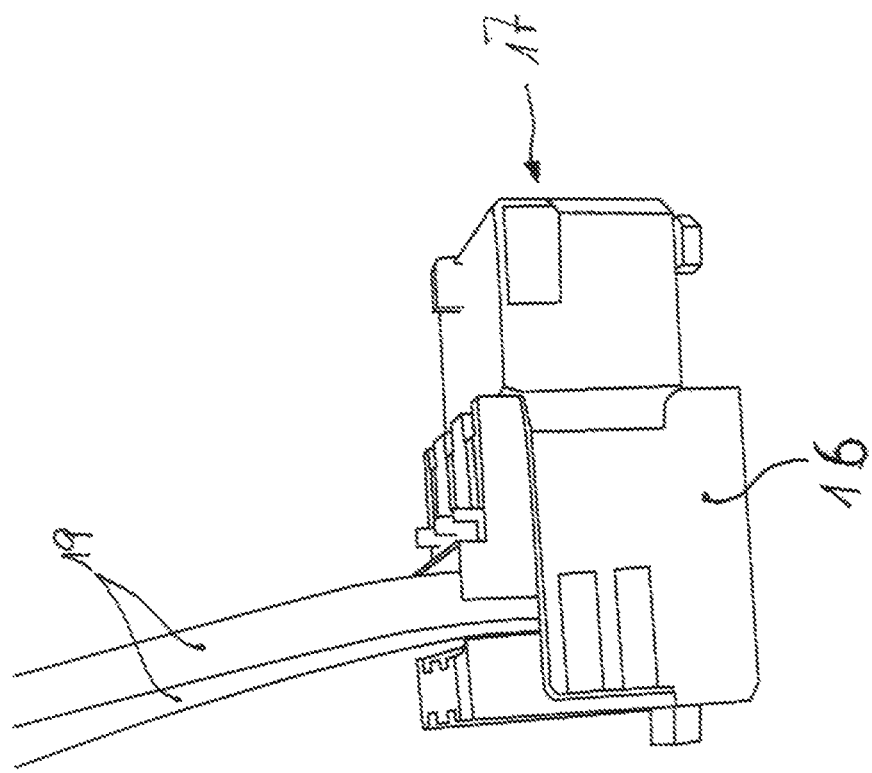
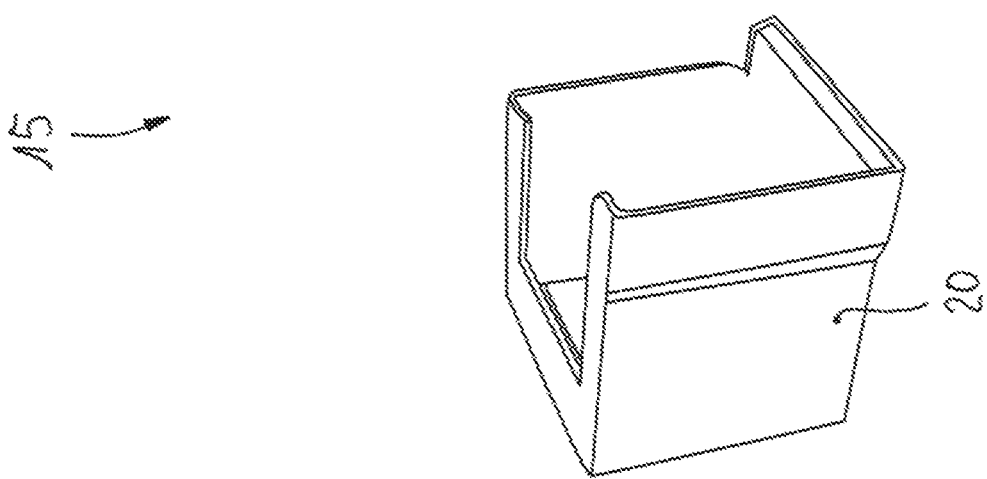
Fig. 3

DOMESTIC APPLIANCE HAVING AT LEAST ONE PLUG FOR AN ELECTRICAL CONNECTION

CROSS-REFERENCES TO RELATED APPLICATIONS

This application is the U.S. National Stage of International Application No. PCT/EP2017/076214, filed Oct. 13, 2017, which designated the United States and has been published as International Publication No. WO 2018/077634 A1 and which claims the priority of German Patent Application, Serial No. 10 2016 221 063.7, filed Oct. 26, 2016, pursuant to 35 U.S.C. 119(a)-(d).

BACKGROUND OF THE INVENTION

The present invention relates to a household appliance, in particular a household dishwasher, having at least one plug for electrical contacting, wherein the plug comprises a body for mechanically retaining one or more electrically conductive contact(s).

It is known to provide electrical plug connections on and in household appliances directly (on a circuit board) or indirectly (by interconnecting a base plate or socket), said plug connections in particular also being able to contact internally different modules in the household appliance.

With high outputs in these plug connections and high current strengths, there is a specific risk that in the event of a fault a fire may result in the plug, which may then also affect modules arranged surrounding the plug.

Attempts are therefore made to protect surrounding modules or other components, like also surrounding furniture, textiles or suchlike, from damage as a result of an overheating occurring in the plug for as long as possible.

For this purpose, a new test, known as the nichrome wire test, has been introduced in particular in the USA, during which plug connections are set alight as a result of very high temperatures.

The problem underlying the invention is to protect components and component parts disposed close to an electrical plug connection against a fire occurring in the plug as effectively as possible.

BRIEF SUMMARY OF THE INVENTION

The inventive household appliance, in particular a household dishwasher, has at least one plug for electrical contacting, wherein the plug comprises a body for mechanically retaining one or more electrically conductive contacts. As a result of an additional protective hood or an additional protective housing extending at least largely over the body, the burning point of which is higher than that of the body material, the fire protection for the inventive household appliance is considerably improved. Surrounding parts are well protected from the heat dissipation which may occur in the region of the electrical plug connection by means of this protective cap additionally attached to the plug. At the same time, the outlay is low and a retrofit is possible. With the inventive solution, the cited new test requirements are achieved without affecting the manufacturing process and previously already existing components. The problem is solved in a very cost-effective manner.

In particular, the retrofit is simple if the protective hood forms a separate structural unit which can be assembled individually as a plug component part. Such a protective hood can then subsequently also be placed on an existing plug. Similarly, in an existing production line the protective hood can be easily additionally introduced without changing the other components.

However, it may also be advantageous if the plug is provided with a protective hood already attached thereto as a pre-fabricated component and this is installed in the household appliance during its manufacture. This simplifies the storage and advantageously saves on an assembly step in the, preferably automated, mass production of household appliances, in particular household dishwashers.

The plug can favorably be connected internally in the household appliance, for instance when contacting a heat pump disposed in the appliance. In such a narrow region, in which many structural units are in the close-up range of the plug connection, the protective hood may also take good effect in order to protect this close-up range.

The invention is of significant use above all if currents with current strengths of more than 2 amperes are routed through such an electrical plug connection. For electrical connections of this type, stringent tests are nowadays carried out in accordance with the nichrome glow wire test according to the American standard UL 749 revision 10, in which the safety of the connection even with a significant heat development has to be proven.

The melting temperature of the material of the protective hood lies in particular at more than 260° C., so that this protective hood is able to withstand high temperatures for a long time.

Furthermore, it is particularly favorable if with respect to its flammability the material of the protective hood lies in the protection class V-0 according to the test standard UL94.

Moreover, the material of the protective hood favorably has an electrical withstand voltage of more than 240 V, so that the protective hood cannot only be used for small voltages, but instead also for mains voltages and connections with several 100 Watts or in the kW range.

A high mechanical stability and also an increase in the burning point of the protective hood is in particular achieved if the material of the protective hood is fiber-reinforced by in particular glass and/or mineral fibers.

For instance, Fortron 4665 B6 is considered as the material of the protective hood.

The protective hood can be inherently stable, so that it can extend over the body in a tight and stable manner and to a large extent also prevents the ingress of oxygen into the gap between the body and the protective hood. The fire hazard is also significantly reduced in this way. The protective hood therefore forms a stable housing.

For simple and cost-effective manufacturing, the protective hood can also be embodied in one piece, for instance as an injection-molded part. Manufacture from a metallic sheet metal is also considered.

For easy assembly, the protective hood has, in particular on one side, a cut-out for passing through one or more cable(s) or wires. Particularly favorably this cut-out is openly accessible from the side, so that cables or wires do not have to be pushed through, but the protective hood can be assembled when the plug is inserted and provided with continuous cables. The cables must not be removed in the process thereby rendering the retrofit conceivably easy.

If the protective hood is provided internally with ribs or moldings which similarly taper the cross-section, the fit on the body can be stabilized as a result, and in the assembled position the protective hood can be held at least in a force-fit manner on the body of the plug. The plug can in particular also form what is known as a group plug.

For good mechanical protection, in the assembled position the protective hood or the plug can be retained in a form-fit manner on a base plate, into which at least the contacts of the plug can be inserted, and for instance engage behind an edge or a cut-out in this base plate.

A good visual inspection of the correct fit of the protective hood on the body of the plug is achieved if the protective hood is provided with at least one cut-out, which, with a correct fit of the protective hood on the body, allows a part thereof to be visible. In particular, the part of the plug which is visible through the cut-out can belong to an unlocking lever for releasing the form-fit retention of the plug on the base plate. The plug can then also be released when the protective hood is assembled.

For instance, the plug is a conventional and standard 3-pin plug or 5-pin plug.

Other developments of the invention are disclosed in the dependent claims.

The advantageous embodiments and developments of the invention described above and/or reproduced in the dependent claims can be applied individually or also in any combination, except, for instance, in cases where dependencies are explicit or alternatives cannot be combined.

Figure 2:
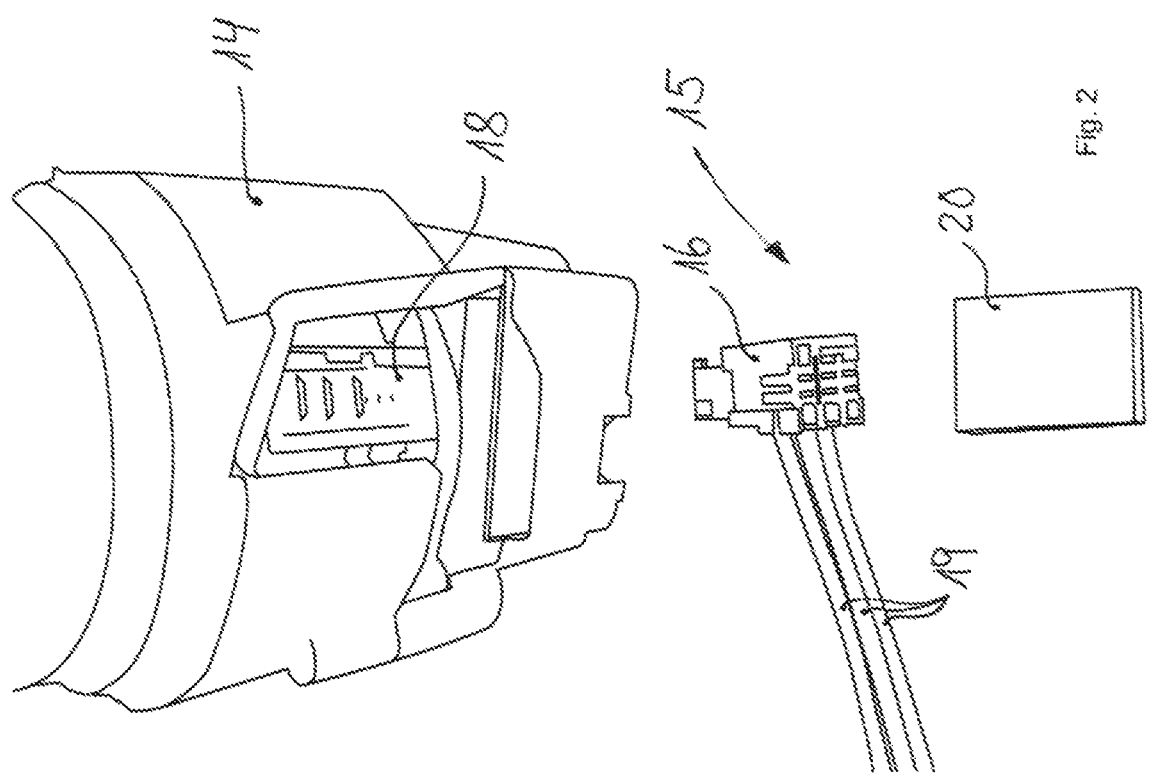
Figure 4:
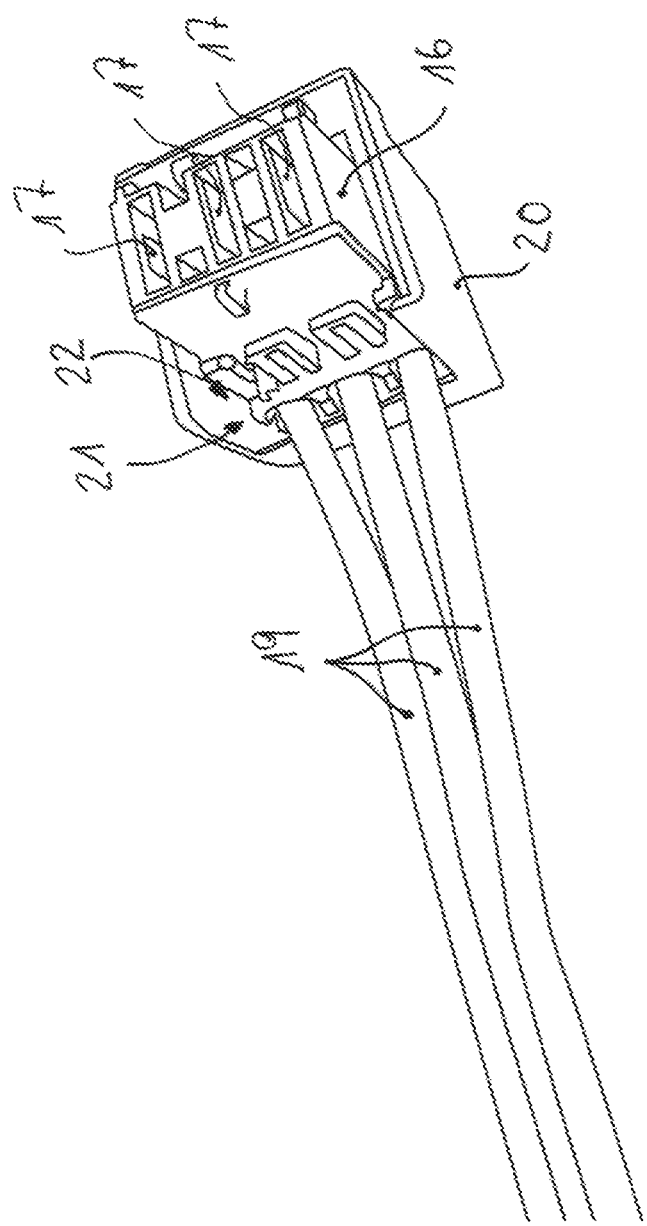
Figure 5:
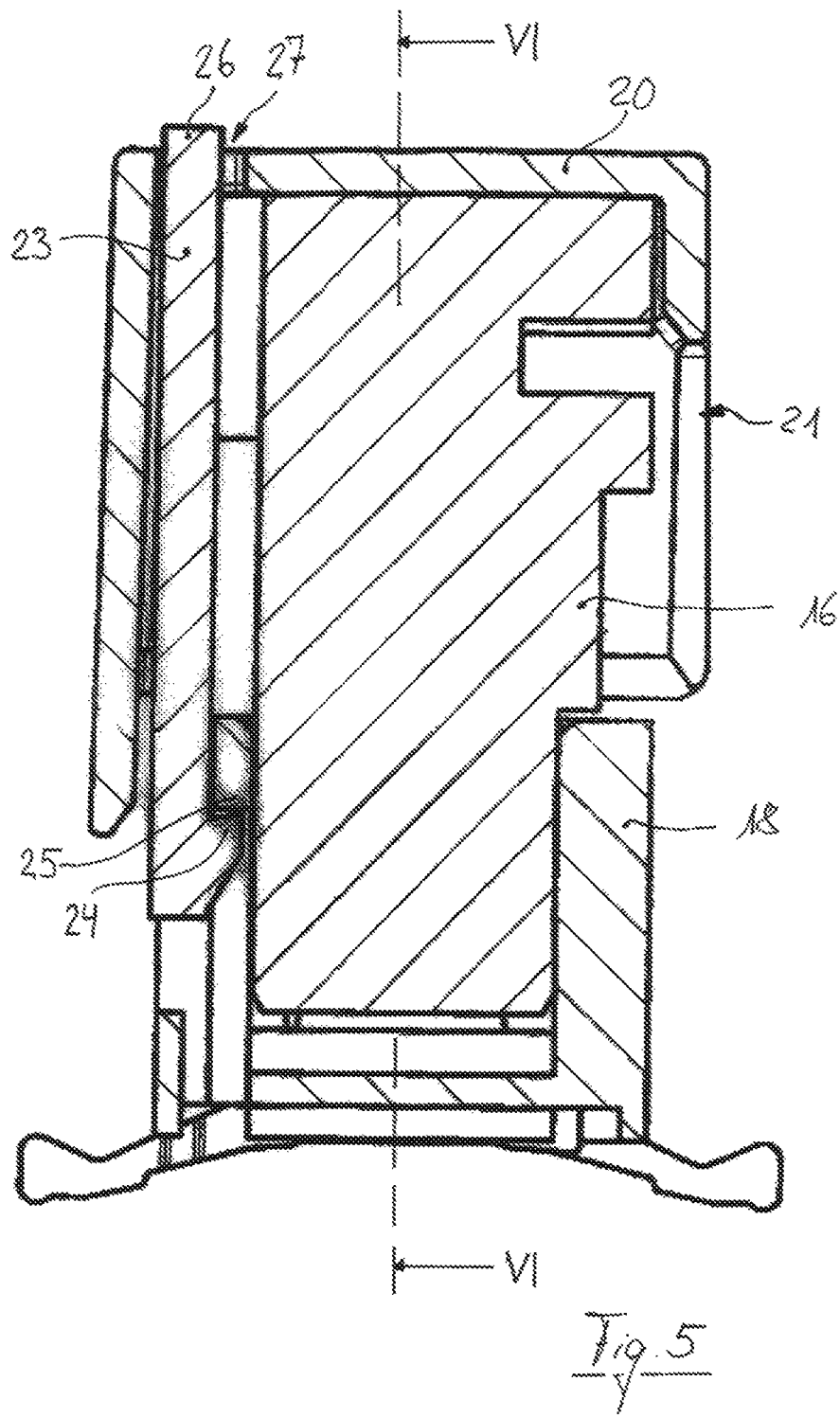
Figure 6:
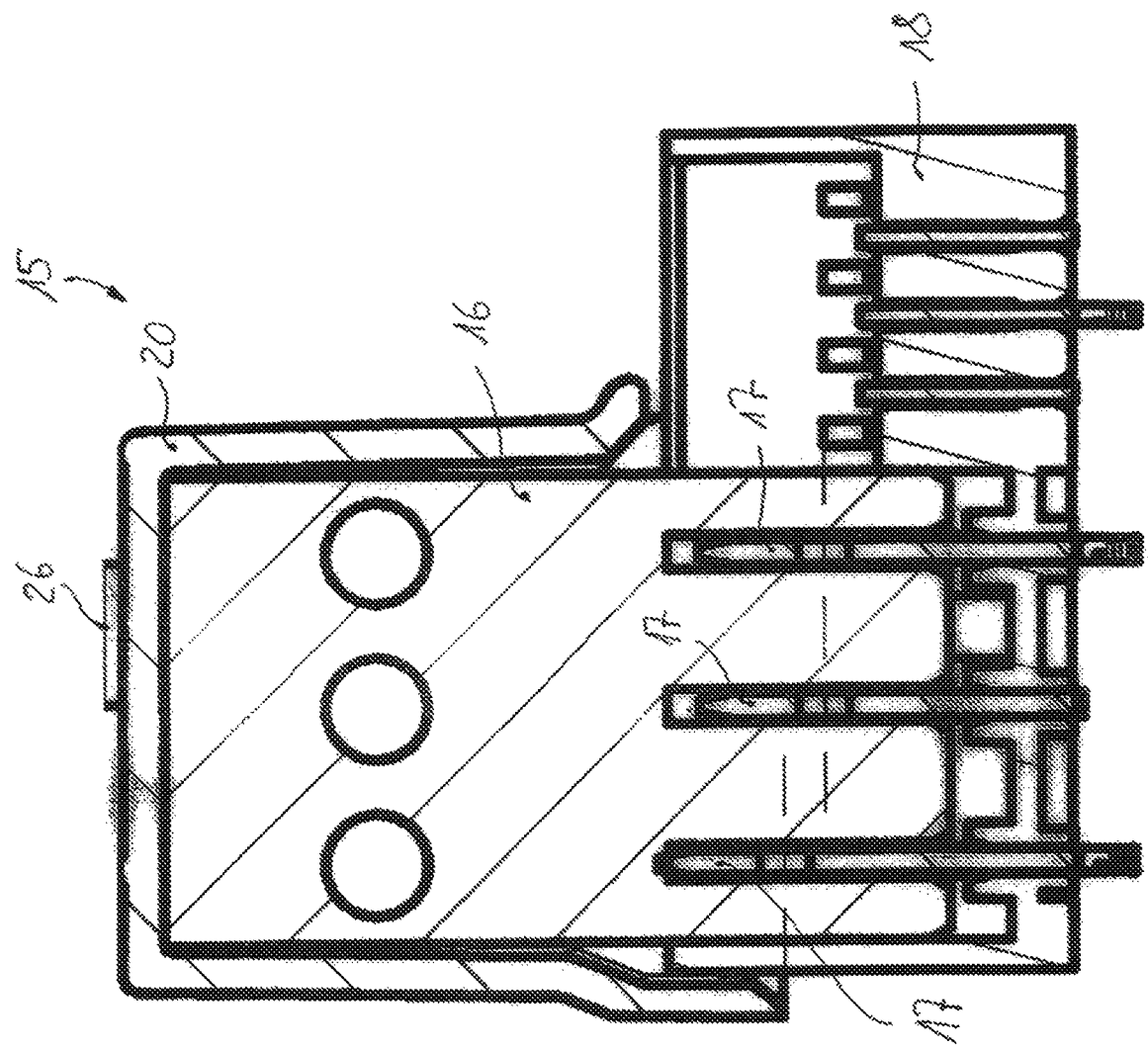
Figure 7:
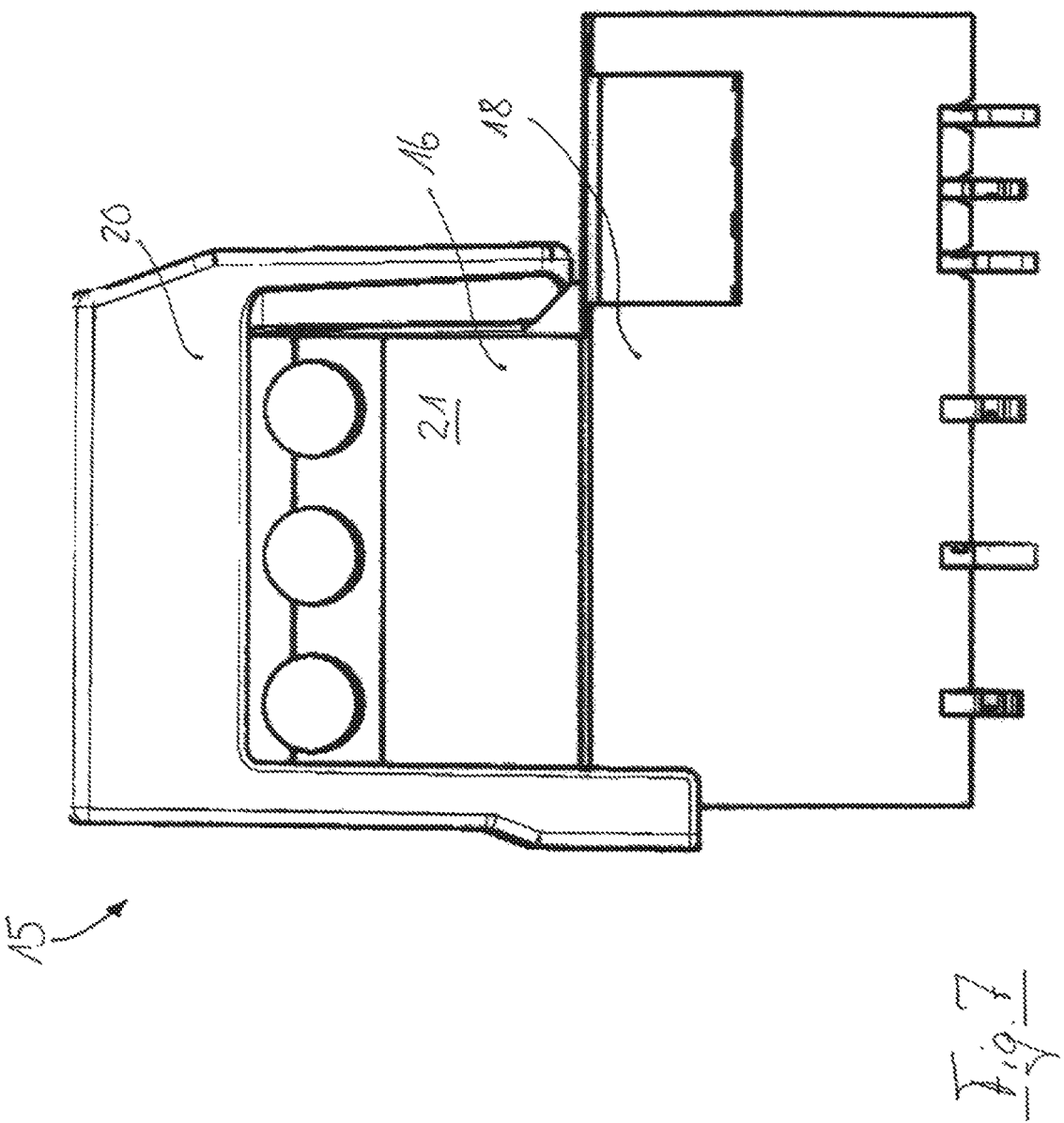
Figure 8:
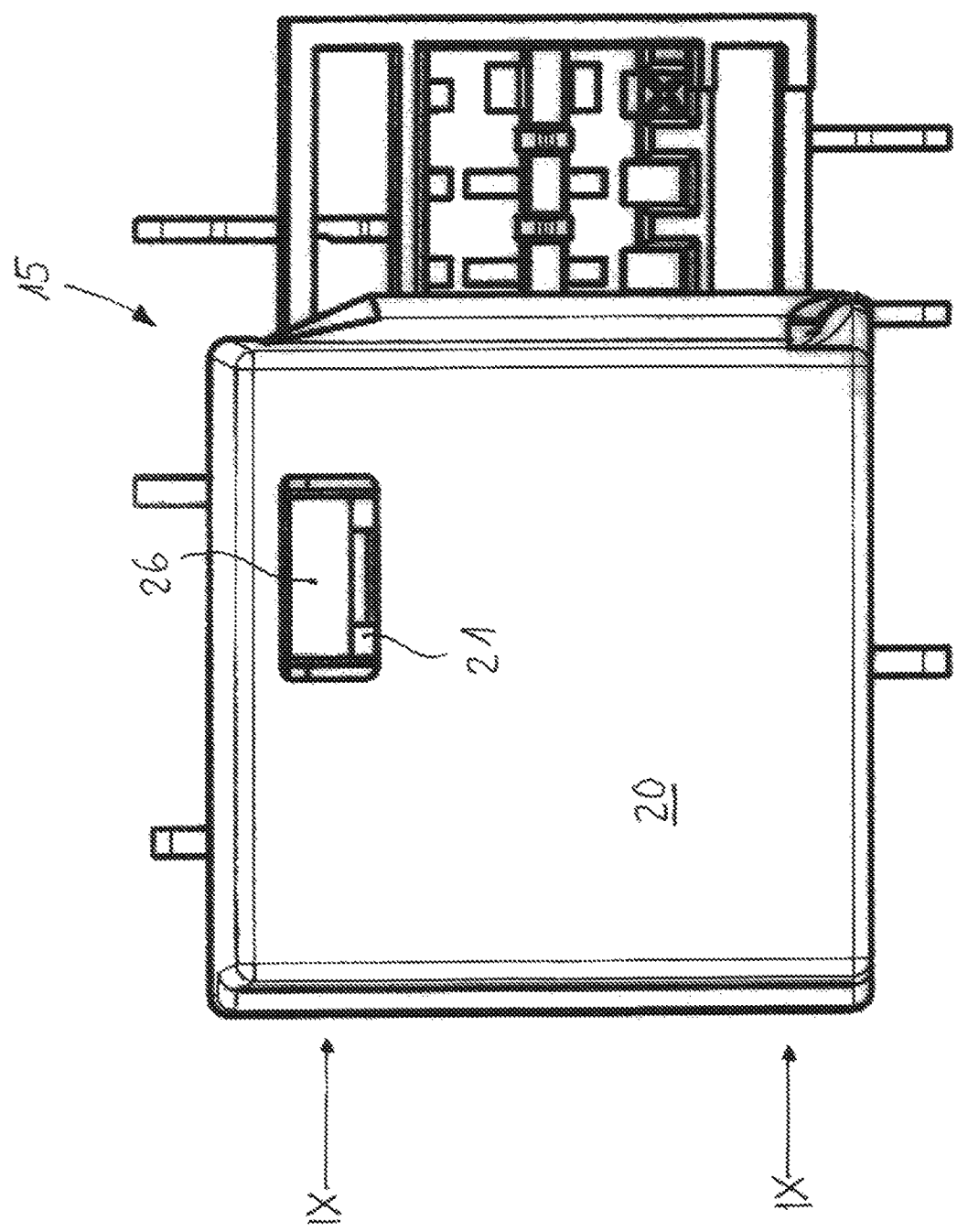
Figure 9:
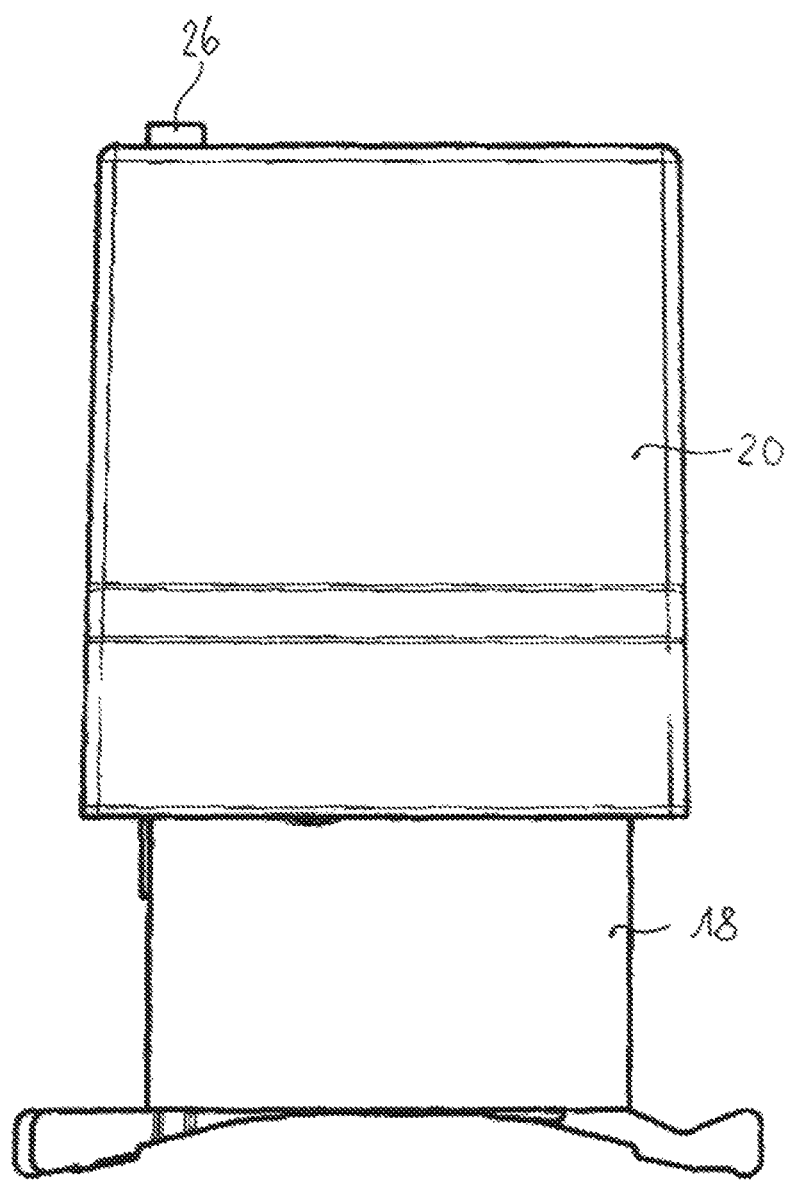

The invention and its advantageous embodiments and developments and its advantages are described below in greater detail with reference to drawings displaying exemplary embodiments. These are schematic diagrams in which:

BRIEF DESCRIPTION OF THE DRAWINGS the drawings show:

FIG. 1 a schematic perspective view obliquely from the front of an embodiment of a household appliance, here by way of example a dishwasher, with a front door here, FIG. 2 an exploded view of a heat pump with a plug base plate disposed thereon for electrical contacting and a plug still to be released and a not yet assembled protective hood, FIG. 3 a perspective individual part view of a body of a plug and a not yet assembled protective hood, wherein the plug is already provided with cables and wherein an upper end of an unlocking lever projects upwards for the purpose of reaching through a cut-out in the protective hood, FIG. 4 a perspective view of the plug with the protective hood extending over a body and with cables exiting therefrom, FIG. 5 a section along the plane V-V in FIG. 4, but without a continuous cable or wire, FIG. 6 the plug retained on the base plate with an assembled protective hood in a sectional view of the plane VI-VI in FIG. 5, FIG. 7 the plug retained on the base plate with an assembled protective hood in a view from the insert side of the cable, FIG. 8 the plug retained on the base plate with an assembled protective hood in a view from above onto the plane of the base plate opening, and FIG. 9 the plug held on the base plate with an assembled protective hood in the front view from the direction of arrows IX-IX in FIG. 8.

DETAILED DESCRIPTION OF EXEMPLARY EMBODIMENTS OF THE PRESENT INVENTION

The dishwasher shown schematically in FIG. 1 is a household dishwasher. Other household appliances 1, such as for instance washing machines, tumble dryers, ovens or similar can also be considered. The dishwasher shown here has a dishwasher cavity 2 for receiving items to be washed, to be processed, such as dishes, pots, cutlery, glasses, cooking utensils etc, as a component part of an appliance body 5 which is partially outwardly open or closed. The item to be washed can be held here for instance in the basket 11 and/or a cutlery drawer 10 and can in the process be applied with what is known as washing liquor. Here washing liquor is understood to mean fresh water or in particular water with or without detergent and/or rinsing agent and/or drying agent circulating during operation. The dishwasher cavity 2 can have an at least substantially rectangular layout with a front side V which faces a user in the operating position. Here this front side V can form part of a kitchen front comprising pieces of kitchen furniture disposed adjacent to one another or with a standalone appliance also regardless of further pieces of furniture.

The dishwasher cavity 2 can be closed by a door 3 in particular on this front side V. In FIG. 1 this door 3 is shown in a position partially opened and then oblique to the vertical position. In its closed position, it stands upright and for its opening in accordance with the diagram can be swung open forwards and downwards in the direction of the arrow 4 about a lower horizontal axis, so that in the completely opened position it is at least almost horizontal.

In the closed position, the door 3 can be provided with a decorative panel 6 on its vertical outer and front side V facing the user in order to experience a visual and/or haptic perception and/or an adjustment to surrounding kitchen furniture.

The household appliance 1 is embodied here as standalone or as what is known as a partially integrated or also fully integrated appliance. In the latter case, the appliance body 5 can also finish substantially with the outer walls of the dishwasher cavity 2. A housing surrounding this externally may then be unnecessary. A base 12 for receiving in particular functional elements, like for instance a pump described again in more detail below, or in particular heat pump 14, is disposed in the lower region of the dishwasher.

In the exemplary embodiment according to the drawing, the movable door 3, in its upper region, is assigned a control panel 8 which extends in the transverse direction Q of the dishwasher, it being possible for said control panel to comprise an engagement opening 7 which is accessible from the front side V for manual opening and/or closing of the door 3. In the transverse direction Q, the dishwasher frequently has an extension of 45, 50 or 60 centimeters. The extension likewise frequently lies at approximately 60 centimeters in the depth direction downwards from the front side V. The values are not mandatory.

The dishwasher cavity 2 is delimited peripherally by overall four vertical walls 13 and two horizontal walls 13 when the door 3 is closed, of which one forms a ceiling and one further a base of the dishwasher cavity 2.

The household appliance 1, here the household dishwasher shown, has at least one (more are also possible) plugs 15 for an electrical contacting. By way of example FIG. 2 shows a plug 15 for contacting the heat pump 14, wherein the plug 15 comprises a body 16 for mechanically retaining one or more electrically conductive contact(s) 17 and can be connected here for instance to a base plate or bush 18 as a counterpart. As here, the contacting can either take place indirectly or also directly. Here the contacts 17 can be embodied for instance as springs or tongues. The number of contacts 17 is also different depending on requirements. The base plate or bush 18 can be arranged here fixed to the housing of the heat pump 14, as shown in FIG. 2. In this case, the plug 15 is therefore connected internally in the household appliance 1. An external connection is essentially also possible.

As easily visible in FIG. 4, in the functional position the body 16, which consists for instance of a thermoplastic, for instance schulamid or ultramid, is at least largely surrounded by a protective hood 20, the burning point of which is higher than that of the body material. The protective hood 20 therefore forms a shield from overheating and risk of fire associated therewith. This shield can essentially act in both directions.

In particular, in order to fulfill the afore-cited test procedure UL 94, it is however assumed that the overheating occurs in the region of the plug 15 and its electrical contacts 17, and surrounding components are therefore to be shielded against this overheating. Such a risk of overheating ensues in particular with such plugs which are provided to transmit electrical currents with current strengths of more than 2 amperes. Current strengths of this type occur for instance with required high outputs of several 100 or more than 1000 Watts, for instance with a heat pump 14.

The protective hood 20 forms a separate structural unit which can be assembled individually as a plug component part, and in FIGS. 2 and 3 is shown still in its isolated position before assembly. It has aprons which hang down far particularly at the sides, which as far as possible reach the bush or base plate 18 so that the largest possible area of the body 16 is covered by the protective hood 20.

Here the melting temperature of the material of the protective hood is more than 260° C., in particular more than 280° C. Moreover, the material of the protective hood is ideally in the protective class V-0 according to test standard UL94 with respect to its flammability. Similarly, it is favorable for the use of plugs 16 for mains voltages if the material of the protective hood 20 has a withstand voltage of more than 240 V, in particular as here more than 250 V.

In order to fulfill all these requirements and again a mechanical stability, the material of the protective hood is fiber-reinforced by in particular glass and/or mineral fibers. For instance, the material of the protective hood can be Fortron 4665 B6, as offered by Ticona. The material has a very high RTI (relative thermal index), so that it is well suited to the application required here.

A metallic sheet metal is also essentially possible for the protective hood, but nevertheless brings about the risk of sharp edges so that a further processing step is then required after stamping and deep-drawing.

In both cases it is ensured that the protective hood 20 is inherently stable, in other words has no rubbery-elastic or similar compressibility. Furthermore, the protective hood 20 can be embodied in one piece, as can also be taken from the Figures.

For instance, it is easily visible in FIG. 4 that the protective hood 20 has a cut-out 21 for passing through one or more cable(s) or wires 19 only on one side. In particular, as shown here, the cut-out 21 is open toward one side 22 and is therefore suited to slipping over already connected cables or wires 19, without these having to be pushed into the cut-out 21. The cables or wires 19 here are angled on the body 16 by 90° relative to the contacts 17, which may also be different depending on the plug formation.

As a result of the cut-out 21 being openly accessible on the side, it can also be easily retrofitted onto existing plugs 15, by it being easily slipped onto the body 16 of the plug 15. The plug 15 need not be released in the process. The opposing side of the protective hood 20 has no such cut-out 21 and is therefore closed as far as possible. In the direction of the contacts 17 of the body 16, the protective hood 20 is by contrast likewise open, so that the contacting is not hampered.

In order to ensure a secure hold of the protective hood 20 on the body 16, the protective hood 20 is provided on the inside with ribs or similar moldings which taper the cross-section and which ensure a force-fit press fit of the protective hood 20 on the body 16. The protective hood is therefore retained in the assembled position at least in a force-fit manner on the body 16 of the plug 15. In addition or alternatively a form-fit hold is possible, for instance, by the protective hood 20 being able to latch with the body 16 (not shown here).

It is likewise possible for the protective hood 20 or the plug 15, in other words its body 16, to be retainable in the assembled position in a form-fit on the base plate or bush 18, into which at least the contacts 17 of the plug 15 can be inserted, in other words, for instance, by latching.

Such a solution with respect to a latching of the body 16 can be seen in FIG. 5, for instance: An unlocking lever 23 is shown there, which, in the connection position with its hook-shaped lower ("top" and "bottom" are used here according to the drawing and without reference to the actual installation position of the plug 15) end 24 engages in a form-fit manner behind an edge area 25 of the base plate or bush 18. The upper end 26 of the unlocking lever 23 which opposes the rear engagement passes here through a cut-out 27 in the protective hood 20, as is easily visible for instance in FIG. 5 or in the top view according to FIG. 8. This passing through here also serves simultaneously to visually inspect the correct fit of the protective hood 20 on the body 16, by, with a correct fit of the protective hood 20 on the body 16, a part thereof being visible, namely the upper end 26 of the unlocking lever 23.

The plug 15 itself need not be changed for the protective hood 20. It can be formed, for instance, by a standard 3-pin plug or 5-pin plug (or also other plug types). The modification effort of the existing system for accommodating the protective hood 20 is in each case minimized, in particular no change is actually necessary apart from adding and impressing the protective hood 20.

It can also be realized with the press fit that the protective hood 20 overlaps this at least almost without a gap in the overlapped region of the plug, i.e. that as small an air gap as possible remains between the body 16 and the protective hood, which could possibly supply a flame formation produced in the plug 15 with oxygen. The protective hood 20 then forms not only one thermal insulation outwardly, in order to protect surrounding components from a flame formation and overheating which could emanate from the plug 15, but additionally maintains a mechanism for suffocating flames.

The invention claimed is:
1. A household dishwasher comprising:
a pump having a base plate with at least one electrical contact;
a separate and distinct plug for electrically contacting the at least one electrical contact of the base plate of the pump, said plug comprising a body for mechanically retaining an electrically conductive contact, and an unlocking lever disposed on the body of the plug; and
a protective hood extending at least largely over the body of the plug and having a burning point which is higher than a burning point of a material of the body of the plug, wherein the protective hood has side aprons which extend to the base plate of the pump on condition that the plug is held in an assembled position on the base plate of the pump, and wherein the protective hood has a cut-out in an end face thereof which, only on condition that the protective hood is correctly fitted on the body of the plug in a final correct position, renders an end of the unlocking lever of the body of the plug visible by protruding through and beyond the cut-out, thereby to visually confirm the final correct position of the protective hood on the body.

2. The household dishwasher of claim 1, wherein the protective hood forms a separate structural unit configured for assembly individually as a plug component part.

3. The household dishwasher of claim 1, wherein the plug is connected internally in the household dishwasher.

4. The household dishwasher of claim 1, wherein the plug is configured to transmit an electrical current with a current strength of more than 2 amperes.

5. The household dishwasher of claim 1, wherein the pump comprises a heat pump.

6. The household dishwasher of claim 1, wherein the protective hood is made of a material having a melting temperature of more than 260° C.

7. The household dishwasher of claim 1, wherein the protective hood is made of a material which with respect to its flammability lies in a protection class V-0 according to test standard UL94.

8. The household dishwasher of claim 1, wherein the protective hood is made of a material having a withstand voltage of more than 240V.

9. The household dishwasher of claim 1, wherein the protective hood is made of a material which is fiber-reinforced by in particular glass and/or mineral fibers.

10. The household dishwasher of claim 1, wherein the protective hood is made of a material which is Fortron 4665 B6.

11. The household dishwasher of claim 1, wherein the protective hood is inherently stable.

12. The household dishwasher of claim 1, wherein the protective hood is embodied in one piece.

13. The household dishwasher of claim 1, wherein the protective hood has a cut-out for passage of a cable or wire on one side.

14. The household dishwasher of claim 13, wherein the cut-out is open on a side for access.

15. The household dishwasher of claim 1, wherein the protective hood is configured to overlap in an at least almost spacefree fashion in an overlapped region of the body.

16. The household dishwasher of claim 1, wherein the protective hood is configured on an inside with ribs or a structure which tapers a cross-section.

17. The household dishwasher of claim 1, wherein in an assembled state the protective hood is held at least in a force-fit manner on the body of the plug.

18. The household dishwasher of claim 1, wherein at least one of the protective hood and the plug is held in an assembled position in a form-fit manner on the base plate of the pump.

19. The household dishwasher of claim 1, wherein the plug is a standard 3-pin or 5-pin plug.

20. A household dishwasher comprising:
a pump having a base plate with at least one electrical contact;
a separate and distinct plug for electrically contacting the at least one electrical contact of the base plate of the pump, said plug comprising a body for mechanically retaining an electrically conductive contact, and an unlocking lever disposed on the body of the plug; and
a protective hood extending at least largely over the body of the plug and having a burning point which is higher than a burning point of a material of the body of the plug,
wherein the protective hood has a cut-out in an end face thereof which, only on condition that the protective hood is correctly fitted on the body of the plug in a final correct position, renders an end of the unlocking lever of the body of the plug visible by protruding through and beyond the cut-out, thereby to visually confirm the final correct position of the protective hood on the body.

* * * * *